US011561766B2

(12) United States Patent
Mueller et al.

(10) Patent No.: US 11,561,766 B2
(45) Date of Patent: Jan. 24, 2023

(54) CREATIVE AND ADDITIVE RECONCILIATION OF DATA RECORDS

(71) Applicant: BMC Software, Inc., Houston, TX (US)

(72) Inventors: Douglas Mueller, Palo Alto, CA (US); Duncan Paul Grisby, Trumpington (GB); Ajoy Kumar, Santa Clara, CA (US)

(73) Assignee: BMC Software, Inc., Houston, TX (US)

( * ) Notice: Subject to any disclaimer, the term of this patent is extended or adjusted under 35 U.S.C. 154(b) by 70 days.

(21) Appl. No.: 16/289,639

(22) Filed: Feb. 28, 2019

(65) Prior Publication Data

US 2020/0278836 A1    Sep. 3, 2020

(51) Int. Cl.
*G06F 7/14* (2006.01)
(52) U.S. Cl.
CPC ..................... *G06F 7/14* (2013.01)
(58) Field of Classification Search
CPC ..... G06F 7/10; G06F 7/14; G06F 7/16; G06F 7/20; G06F 7/22; G06F 7/32; G06F 7/36
See application file for complete search history.

(56) References Cited

U.S. PATENT DOCUMENTS

| 7,058,861 | B1* | 6/2006 | Adams | H04L 41/0853 714/21 |
| 7,738,640 | B1* | 6/2010 | Bajpay | H04M 15/48 379/114.04 |
| 10,331,706 | B1* | 6/2019 | Yakhnenko | G06F 16/30 |
| 2006/0136585 | A1* | 6/2006 | Mayfield | G06F 7/32 709/224 |
| 2012/0011172 | A1* | 1/2012 | Wada | H04L 41/085 707/812 |
| 2015/0161557 | A1* | 6/2015 | Huntley | G06Q 10/087 705/28 |
| 2016/0012098 | A1* | 1/2016 | Li | G06F 16/24556 707/692 |
| 2017/0039553 | A1* | 2/2017 | Ghatage | G06Q 20/3563 |
| 2018/0336235 | A1* | 11/2018 | Pena Munoz | G06F 16/219 |

OTHER PUBLICATIONS

Nath et al., "Reconciliation engine and metric for network vulnerability assessment," SecurIT'12: Proceedings of the First International Conference on Security of Internet of ThingsAugust 2012, pp. 9-21https://doi.org/10.1145/2490428.2490430 (Year: 2012).*

* cited by examiner

*Primary Examiner* — Mark D Featherstone
*Assistant Examiner* — Kweku William Halm
(74) *Attorney, Agent, or Firm* — Brake Hughes Bellermann LLP

(57) ABSTRACT

A data management system includes a data reconciliation engine that identifies data sources that contain data records referencing a resource and determines whether each of the identified data sources is a creative data source or an additive data source. When all of the identified data sources are additive data sources, the reconciliation engine terminates a data reconciliation process. When all of the identified data sources are not additive data sources, the reconciliation engine finds a first creative data source from among the identified data sources, and initiates the data reconciliation process by merging data from the identified data sources including the first creative data source, one data source-by-one data source, into a reconciled data record.

9 Claims, 4 Drawing Sheets

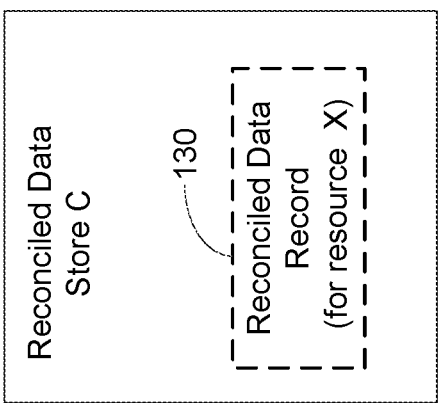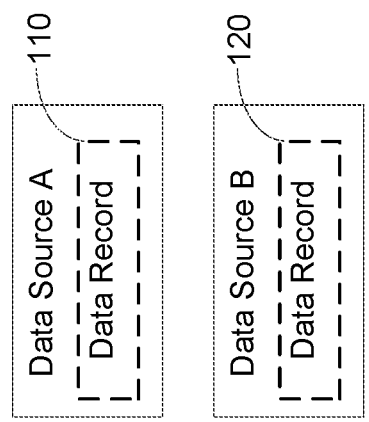
FIG. 1

CREATIVE AND ADDITIVE RECONCILIATION OF DATA RECORDS

TECHNICAL FIELD

The present disclosure relates generally to the reconciliation of data records in databases.

BACKGROUND

An organization (e.g., a business) may own or use any number of items, objects, or resources (hereinafter "resources") in its activities. A resource may be a physical object or a virtual object. For example, in the context of Information Technology (IT) infrastructure, illustrative "resources" may include, but are not limited to, computer systems, components of computer systems, data storage systems, switches, routers, memory, software applications (e.g., accounting and database applications), operating systems, business services (e.g., order entry, change management, and tracking services) and records, etc.

A data management system can receive multiple data records (that are related, for example, to the resources of an organization) from different data sources. Each data record may relate to or reference a resource and describe various attributes of the resource. The sets of attributes of a resource included in the multiple data records may be non-overlapping (in other words, a first data record referencing a resource may include less, more, or different attributes of the resource than a second data record of the resource). A reconciliation process may be used merge or consolidate the different data records received from the different sources to obtain, for example, a consistent or more complete description of the resource in the data management system and the different data sources. Such a reconciliation process may, for example, avoid duplication of information. Avoiding duplication of information can be advantageous, for example, for accurate accounting and inventory purposes.

In a typical data reconciliation process for reconciling data records from the different data sources for a resource, data records of the resource from each data source may be found, and a set of reconciliation rules may be implemented to create a merged data record for the resource. The merged data record may be placed in a result store. In some instance, a data record for a resource may be received from only one data source, but not from another data source. In such instances, creating a merged data record for the resource may simply involve copying the data record received from the only one data source to the result store (as there is no other data record for the resource with which to merge or reconcile).

SUMMARY

A data management system includes a data reconciliation engine that identifies data sources that contain data records referencing a resource and determines whether each of the identified data sources is a creative data source or an additive data source. When all of the identified data sources are additive data sources, the reconciliation engine terminates a data reconciliation process. When all of the identified data sources are not additive data sources, the reconciliation engine finds a first creative data source amongst the identified data sources, and initiates the data reconciliation process by merging data from the identified data sources, including the first creative data source, one data source-by-one data source, into a reconciled data record.

In a general aspect, a method for reconciling data related to a resource includes determining whether a first data source and a second data source each include a respective data record referencing the resource. The method includes identifying the first data source as a creative data source and the second data source as an additive data source.

When the first data source identified as the creative data source does not include the respective data record referencing the resource, the method terminates the reconciliation process without considering the additive data source.

When the first data source identified as the creative data source includes the respective data record referencing the resource, the method includes merging data from that data record into a reconciled data record for the resource. Further, if the second data source identified as the additive data source includes the respective data record referencing the resource, the method includes merging data from that data record into the reconciled data record for the resource.

In an aspect, identifying the first data source as the creative data source is based on the respective data record therein referencing the resource whose existence is confirmed, and identifying the second data source as an additive data source is based on the respective data record therein referencing the resource whose existence is not confirmed.

BRIEF DESCRIPTION OF THE DRAWINGS

FIG. 1 is a schematic illustration of a system including a data source A and a data source B, and a reconciled data store C.

DETAILED DESCRIPTION

Figure 2:
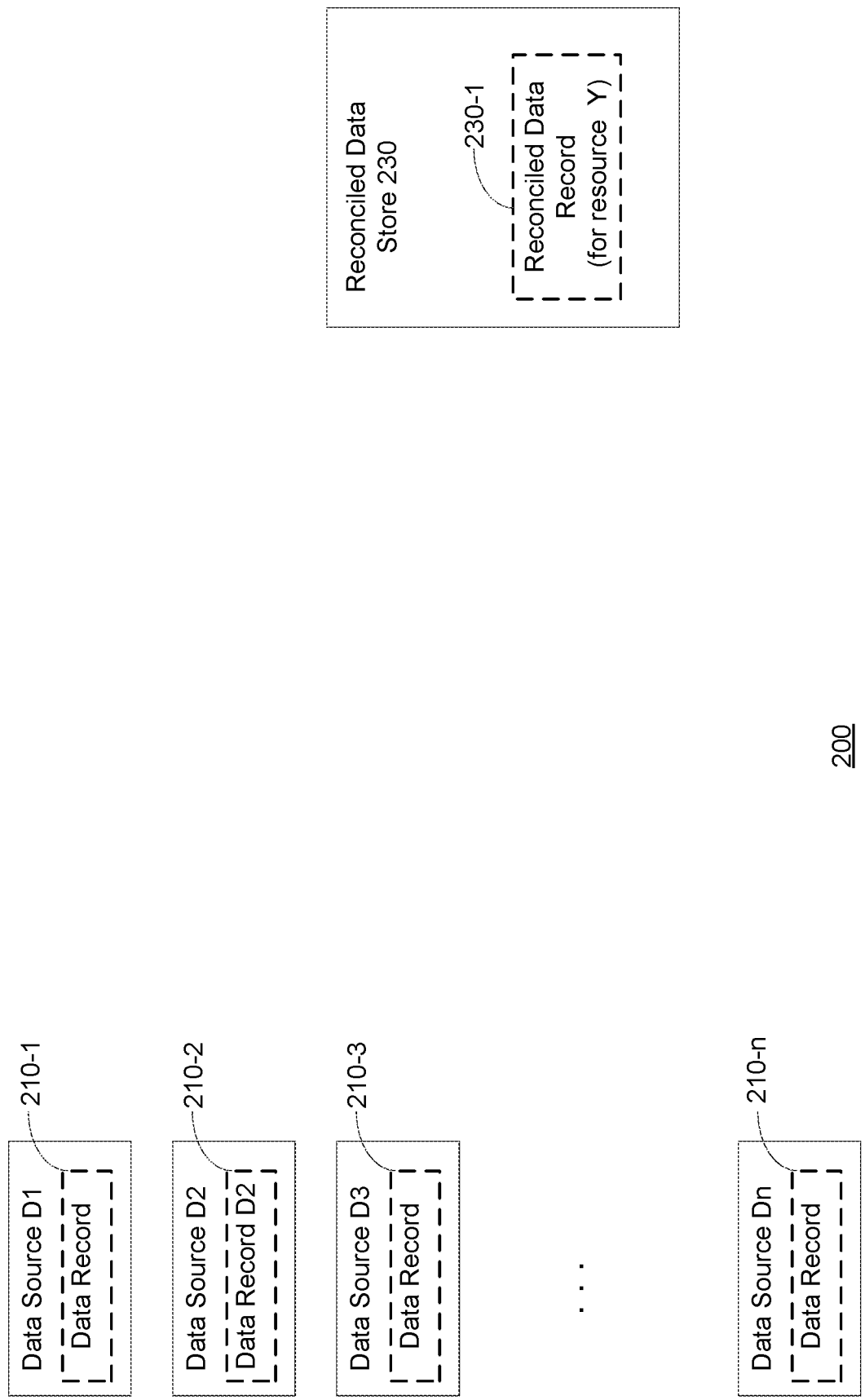
FIG. 2 is a schematic illustration of a system that includes n data sources and a reconciled data store.

The phrase "a data record (or data source) referencing a resource" as used herein will be understood to refer to a data record that is related to the resource and/or includes data values for one or more attributes of the resource.

Systems and methods for reconciling data records of a resource in a plurality of data sources are described herein. Each of the data records in the plurality of data sources can include various attributes of the resource. Some data records may include or reference a resource whose existence is confirmed (e.g., by discovery of the resource on a network using a tool to discover resources). Other data records may include or reference a resource whose existence is not confirmed.

In accordance with the principles of the present disclosure, the systems and methods involve creation of reconciled data records that are stored in a reconciled data store, while leaving the underlying data records in the plurality of data sources in an unaltered state. In other words, the systems and methods reconcile data records in the plurality of data sources by pulling data into the reconciled data store without changing data, or storing additional data, in the plurality of data sources.

Further, in accordance with the principles of the present disclosure, the systems and methods can control or limit the underlying data records or data sources used for the creation of the reconciled data records based on, for example, the nature or characteristics of the underlying data records or data sources.

In a first example implementation, the systems and methods may, for example, exclude data records or data sources that are manually prepared by executing the reconciliation process.

In a second example implementation, the systems and methods may, for example, control or limit reconciliation of data records to only those combinations of data records in which each data record explicitly includes or references a common resource. If a common resource does not exist, or is not referenced in every data source in the combination of data sources, the combination of data records is not reconciled.

As an example of controlling or limiting reconciliation of data records to selected combinations of data records, the systems and methods may, for example, control or limit reconciliation of the data records to only those data records that include or directly reference a resource whose existence is confirmed.

not include or reference a confirmed existing resource may be categorized as an "Additive" data source.

While there may be no limit on the number of data sources that can participate in the reconciliation processes, for simplicity, the reconciliation processes may be described herein using an example of two data sources (i.e., data source A and data source B, FIG. 1). It will be understood that the reconciliation processes generally can be extended to include reconciliation over any number of data sources using the same principles used for reconciliation over the two example data sources (i.e., data source A and data source B).

A traditional reconciliation process is illustrated herein using an example of two data sources (i.e., data source A and data source B) with reference to FIG. 1 and TABLE I below.

FIG. 1 shows system 100 including a data source A and a data source B, and a reconciled data store C. Data source A may include, for example, a data record 110 and data source B may include, for example, a data record 120. One or both of data record 110 and data record 120 may reference a resource (e.g., resource X). The traditional reconciliation process may be used to create a reconciled data record (e.g., reconciled data record 130) for resource X. Table I shows the logic that may be used in the traditional reconciliation process to create reconciled data record 130 for resource X

TABLE I

| Data Source A<br>Does source include a data record referencing selected resource X? | Data Source B<br>Does source include a data record referencing selected resource X? | Reconciled Data Store<br>Create reconciled data record for resource X? |
| --- | --- | --- |
| Yes | Yes | Yes. Create reconciled data record by merging the records for Data Source A and Data Source B. |
| Yes | No | Yes. Create reconciled data record by copying Data Source A record as a reconciled data record. |
| No | Yes | Yes. Create reconciled data record by copying Data Source B record as a reconciled data record. |

The systems and methods may involve creating a reconciled data record for each data source based on a data record that includes or references a resource whose existence is confirmed.

Further, the systems and methods involve recognizing that a data source may have a data record that references a resource whose existence is not confirmed. A reconciled data record need not be created in the reconciled data store for such a data record/data source. However, if there is data in the other data sources confirming existence of the resource (thus, causing creation of a reconciled data record for the confirmed existing resource in the reconciled data store), the data record/data source that references the resource without confirmed existence of the resource can be included in the reconciliation process. Data from the data record/data source that references the resource without confirmed existence of the resource can be added to the reconciled data record previously created for a data source that has a data record that includes or references the resource with confirmed existence of the resource.

For convenience in description of the reconciliation processes described herein, each data source that has a data record that includes or references a confirmed existing resource may be categorized as a "Creative" data source. Conversely, each data source that has a data record that does In the traditional reconciliation process, a resource (e.g., resource X) is selected for related data in the data sources to be reconciled. As shown in TABLE I, data source A and data source B may be checked to determine if data records referencing the selected resource (i.e., resource X) are present in data source A and/or in data source B.

If a data record referencing the selected resource is present in only one source (e.g., data record 110, or data record 120), the present data record (e.g., data record 110 or data record 120) may be copied as a reconciled data record (i.e., reconciled data record 130) created in reconciled data store C.

Further, if data records (e.g., data record 110, data record 120) related to the selected resource are present in both the sources, the two data records are reconciled (i.e., merged or consolidated) into a reconciled data record (i.e., reconciled data record 130), which may be stored in a reconciled data store C. The reconciliation may include merging or consolidating the attributes of resource X included in the two data records (e.g., data record 110, data record 120) according to a set of reconciliation rules. These reconciliation rules may, for example, define an order of precedence between the two sources and determine which attributes should be selected from which source to be included the reconciled data record.

It is noted that in the traditional reconciliation process described above, creation of a reconciled data record does not depend on confirmation of the actual existence of the resource (e.g., resource X) referred to by the data records over which the reconciliation takes place. Confirmation of the actual existence of the resource is not a determinative feature in the traditional reconciliation process. It is sufficient that a data record references the resource (e.g., resource X) without regard to whether the referenced resource actually exists. In other words, the traditional reconciliation process (unlike the reconciliation processes of the present disclosure) does not distinguish between the "Creative" data sources and "Additive" data sources.

In accordance with the principles of the present disclosure, in an example implementation, the systems and methods of the present disclosure involve characterizing each data source that may be used in preparing a reconciled data record for a resource as being one of two types—either a Creative data source or an Additive data source.

Both Creative data sources and Additive data sources may include data records that reference the resource. A reference to (or presence of) a resource in a Creative data source can trigger a reconciliation process and cause a reconciled data record for the resource to be created regardless of any reference (or absence of reference) to this resource in any other data source. Further, all other data sources (Creative or Additive) that reference this resource can be included in the reconciliation process triggered by the reference to (or presence of) the resource in the Creative data source.

A reference to (or presence of) a resource in an Additive data source does not trigger a reconciliation process, but indicates that the data record can be considered in any otherwise-triggered data reconciliation process for the resource (e.g., triggered by the presence of a data record referencing the resource in a Creative data source).

In an example implementation, the foregoing characterization of the data sources as being Creative or Additive may be based, for example, on whether the referenced resource's existence is confirmed (e.g., by using a tool that discovers resources on a network). A data source with a data record that references or includes a resource whose existence is confirmed may be characterized as being a Creative data source. Conversely, a data source with a data record that references or includes a resource whose existence is not confirmed may be characterized as being an Additive data source.

In other example implementations, the characterization of the data sources as being Creative or Additive may be based on additional or alternate criteria (other than the confirmed existence of the referenced resources). For example, in an example implementation, data sources that are prepared manually (e.g., by a data provider) may be characterized as being Additive data sources. In another example implementation, data sources that are based on public information (e.g., acquired by Internet searches) may be characterized as being Additive data sources.

It will be understood that while any number of data sources—identified as being Creative and/or Additive—may be reconciled for a resource, under the systems and methods of the present disclosure, at least one of these data sources must be a Creative data source to trigger the reconciliation process. If all of the data sources are Additive data sources, no reconciliation process can be triggered for the resource.

For a reconciliation process to reconcile data records of a resource to proceed under the systems and methods of the present disclosure, a preliminary processing stage may include a determination of which data sources are Additive data sources and which data sources are Creative data sources. If all of the data sources are Additive data sources, the reconciliation process terminates. At least one of the data sources must be found to be a Creative data source to trigger the reconciliation process. The data record from this Creative data store referencing the resource may be used to prepare a reconciled data record for the resource. The reconciled data record may be prepared for example, by merging or consolidating the attributes of resource X included in the data record from this Creative data store, according to a set of reconciliation rules. This reconciled data record is then further reconciled or updated with resource-related data from the other data sources, one data source-by-one data source.

In accordance with the principles of the present disclosure, a reconciliation process in which reconciliation is initiated based on a determination of which data sources are Additive data sources and which data sources are Creative data sources is illustrated herein using the example of two data sources (i.e., data source A and data source B) with reference to FIG. 1 and TABLE II below.

As discussed above (with reference to FIG. 1), data source A and data source B may, respectively, include data record 110 and data record 120 that reference resource X. Further, in the example shown in Table II below, data source A may be a Creative data source, and data source B may be an Additive data source. To initiate reconciliation, a determination is made if at least one of the data sources (i.e., data source A or data source B) containing a data record (e.g., data record 110 and data record 120, respectively) is a Creative data source. As shown in Table II, only when a Creative data source (i.e., data source A) contains a data record (e.g., data record 110) referencing resource X, a reconciliation process is initiated to create a reconciled data record (e.g., reconciled data record 130) for resource X. When a data record (e.g., data record 120) referencing resource X is found only in an Additive data source (e.g., data source B), but not in the Creative data source (e.g., data source A), the reconciliation process is terminated and no reconciled data record is created.

TABLE II

| Data Source A (A Creative Data Source) Does data source include data record referencing selected resource X? | Data Source B (An Additive Data Source) Does data source include data record referencing selected resource X? | Reconciled Data Store Create reconciled data record for resource X? |
|---|---|---|
| Yes | Yes | Yes. Create reconciled data record by merging Data Source A and Data Source B records. |
| Yes | No | Yes. Create reconciled data record by copying Data |

TABLE II-continued

| Data Source A (A Creative Data Source) Does data source include data record referencing selected resource X? | Data Source B (An Additive Data Source) Does data source include data record referencing selected resource X? | Reconciled Data Store Create reconciled data record for resource X? |
|---|---|---|
| No | Yes | Source A record as a reconciled data record. No. Terminate reconciliation process. |

As noted previously, the reconciliation processes of the present disclosure generally can be extended to include reconciliation over any number of data sources using the same principles used for reconciliation over the two example data sources (i.e., data source A and data source B).

Figure 3:
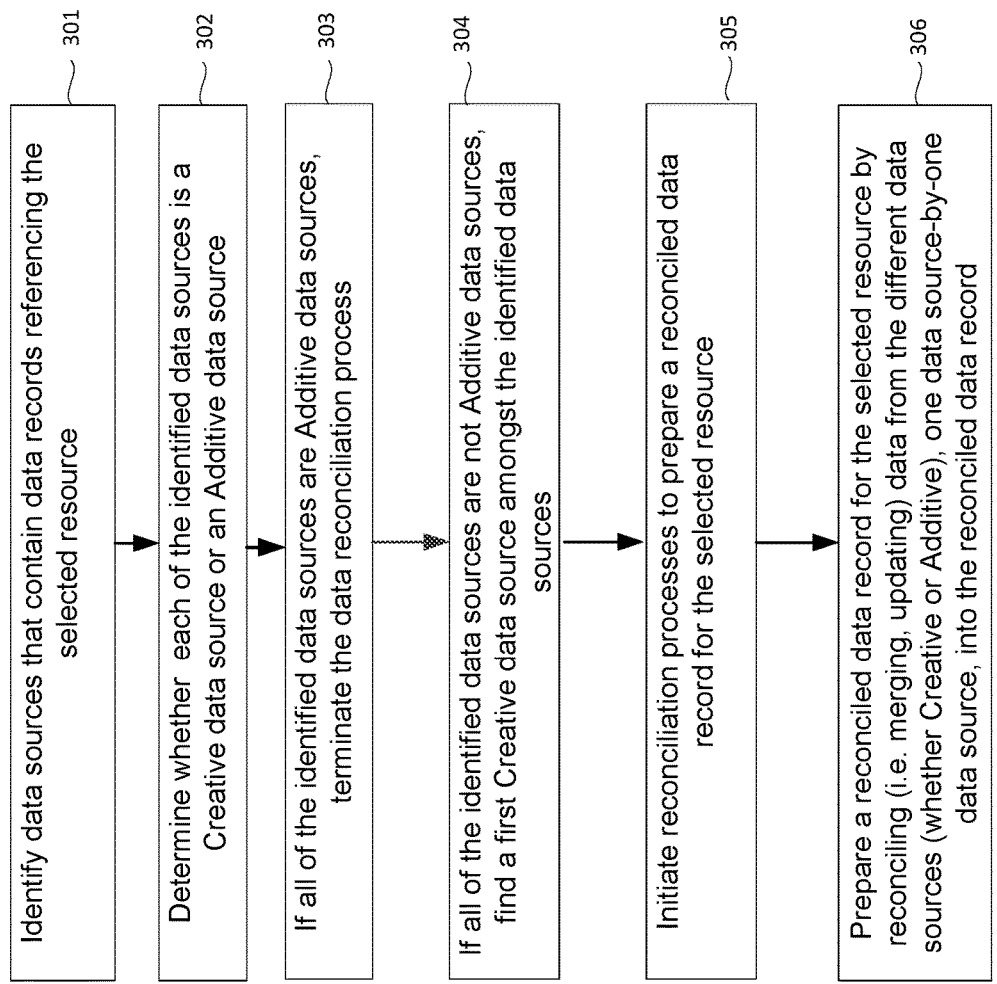
FIG. 3 illustrates example steps of a data reconciliation process that can be used to reconcile data records referencing a resource, in accordance with the principles of the present disclosure.

An example reconciliation method 300 for reconciling data records (referencing a resource Y) is illustrated herein using an example of "n" data sources (i.e., data source D1, data source D2, data source D3 . . . and data source Dn) with reference to FIG. 2 and FIG. 3.

FIG. 2 shows, for example, a system 200 including n data sources (e.g., data source D1, data source D2, data source D3 . . . and data source Dn) and a reconciled data store 230. The data sources may include data records (e.g., a data record 210-1, data record 210-2, a data record 210-3, and data record 210-n, respectively) that may reference resource Y. Reconciled data store 230 may store a reconciled data record 230-1 for resource Y. Reconciled data record 230-1 may, for example, be a data record representing a previous reconciliation (in time) for resource Y, which is updated (i.e., merged with attributes from the underlying data records (e.g., data record 210-1, data record 210-2, data record 210-3, etc.) by a current reconciliation method 300, or may be a new data record created and updated in the current reconciliation method 300.

FIG. 3 illustrates example steps of reconciliation method 300 that can be used to reconcile data records referencing a selected resource, in accordance with the principles of the present disclosure. The data records referencing the selected resource (e.g., resource Y) may be present in one or more data sources (e.g., data source D1 including a data record 210-1, data source D2 including a data record 210-2, data source D3 including a data record 210-3, etc., FIG. 2).

Preliminary to initiating reconciliation method 300 for reconciling data related to resource Y, the data sources over which reconciliation is to be performed may be categorized as being either Creative data sources or Additive data sources.

As shown in FIG. 3, reconciliation method 300 may include identifying data sources that contain data records referencing the selected resource (e.g., resource Y) (301) and determining whether each of the identified data sources is a Creative data source or an Additive data source (302).

Reconciliation method 300 may further include, if all of the identified data sources are Additive data sources, terminating the reconciliation process (303). If all of the identified data sources are not Additive data sources, reconciliation method 300 may include finding a first Creative data source amongst the identified data sources (304), and initiating reconciliation processes to prepare a reconciled data record for the selected resource (305).

Reconciliation method 300 may prepare the reconciled data record for the selected resource by reconciling (i.e. merging, updating) data from the different data sources (whether Creative or Additive), one data source-by-one data source, into the reconciled data record (306). This reconciling of data may be subject to reconciliation rules of precedence (i.e., rules defining the precedence of one data source over a second data source for selecting which data source's attributes are included or not included in the reconciled data record).

In reconciliation method 300, finding a first Creative data source amongst the identified data sources 304 may include finding the first Creative data source by traversing the identified data sources in any order or sequence. In other words, the first Creative data source may be found at any position in a list of the identified data sources.

In reconciliation method 300, reconciling data from the other data sources (whether Creative or Additive), one data source-by-one data source, into the initial reconciled data record 306 may include reconciling data from the different data sources in any order or sequence of the different data sources.

In reconciliation method 300, reconciling data from the different data sources (whether Creative or Additive), one data source-by-one data source, may include traversing the different data sources in a single pass to collect data from the different data sources for merging or updating the reconciled data record for resource Y.

In reconciliation method 300, the reconciled data record for resource Y may be stored in a reconciled data store (e.g., reconciled data store 230) different than the stores for the data records in the data sources (e.g., data source D1, data source D2, data source D3, etc., FIG. 2).

In many instances, a data source may have some data (i.e., attribute values) about a resource that is needed or is useful to have in the merged data record for the resource. However, the data from that data source (i.e., an Additive data source) by itself may not sufficient to warrant creating a reconciled data record in the reconciled data store.

As an illustrative example of reconciliation method 300 for reconciling data records from Creative data sources and Additive data sources, consider the scenario in which one data source (e.g., a Creative data source) contains information on a resource found on a network (e.g., by a discovery tool) and a second data source (e.g., an Additive data source) contains data on the time or date on which that resource was acquired. In such a scenario, it may be useful reconcile the data and produce a reconciled data record for the resource if data on the resource is present in both the first and second data sources. Accordingly, reconciliation method 300 can, at 305 (FIG. 3), initiate reconciliation based on the data record in the Creative data source.

Similarly, when the one data source contains information on the resource found on a network, but there is no information about the acquisition time or date of the resource in the second data source, it may still be useful to have a reconciled data record for the resource in the reconciled data store (e.g., to track the resource, which exists on the network). Accordingly, reconciliation method 300 can, at 305, initiate reconciliation based on the data record in the Creative data source.

However, when the second data source contains data on the time or date on which the resource was acquired, but there is no information about the existence of the resource on the network in the first data source, there is no need or benefit in having a reconciled data record for the resource in the reconciled data store (e.g., because the resource does not exist on the network, there may be no practical need to track the resource). Any need for a mechanism to identify that the acquisition time and date data for the resource exists in the second data store is by itself insufficient to warrant creating the resource in the reconciled data store. Accordingly, reconciliation method 300, at 303, terminates reconciliation based on the data record in the Additive data source. The resource must also be present in another data source before reconciliation method 300 (at 305) creates a reconciled data record for the resource.

Figure 4:
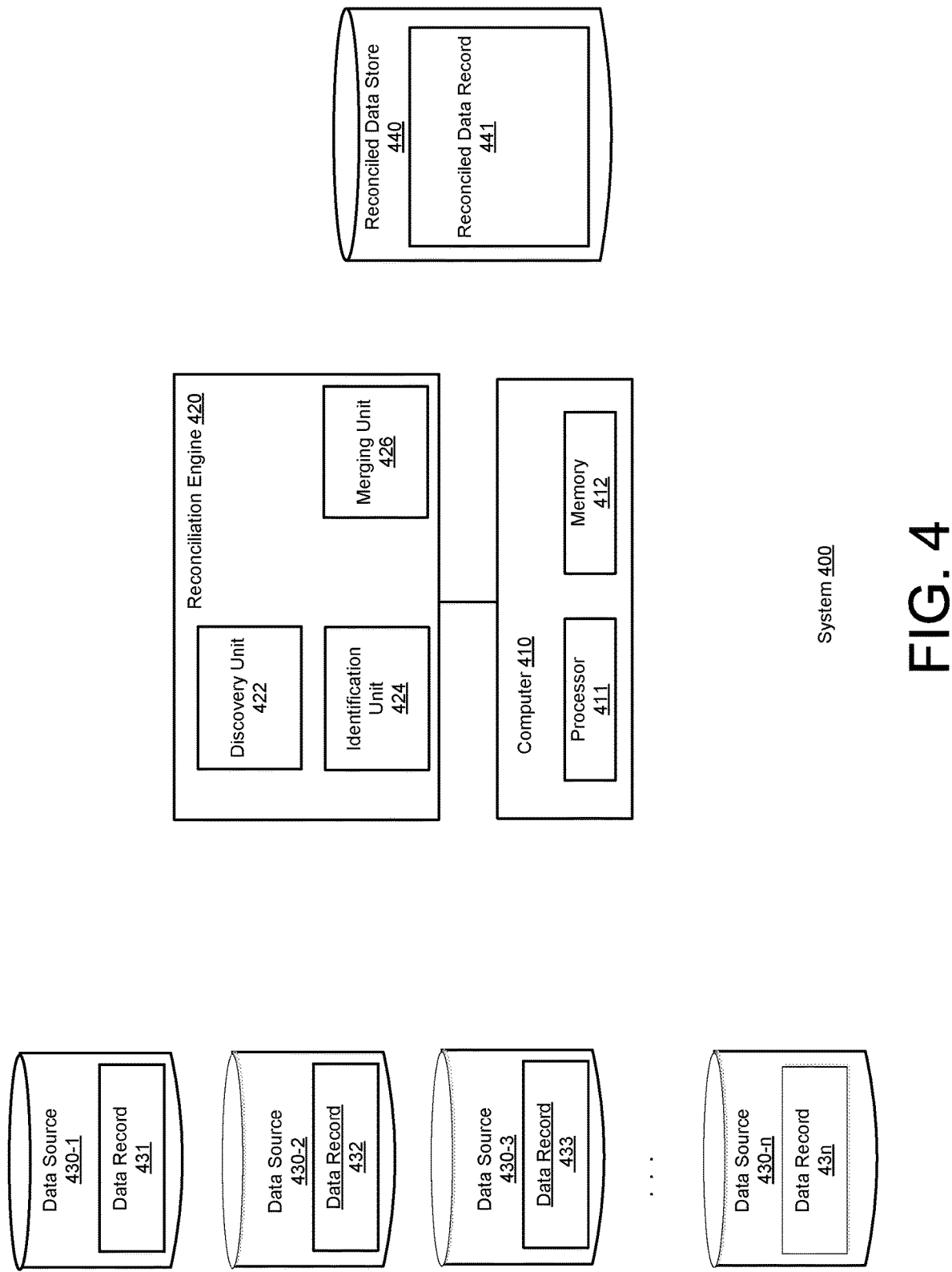
FIG. 4 is a schematic illustration of an example data base management system that may be used to implement the data reconciliation process of FIG. 3, in accordance with the principles of the present disclosure.

FIG. 4 shows an example data base management system (e.g., system 400) that may be used to implement reconciliation method 300 for resources referenced by data records in different data sources, in accordance with the principles of the present disclosure.

System 400 may include, or be coupled to, one or more data stores (e.g., data store 430-1, data source 430-2, data source 430-3 ... data source 430-n, etc.), which contain data records (e.g., data record 431, data record 432, data record 433, data record 43n, etc.).

System 400 includes a reconciliation engine 420 for reconciling the data records of the multiple data sources (e.g., data source 430-1, data source 430-2, data source 430-3, etc.). Each data record may relate to a selected resource (e.g., resource Z) and describe various attributes of the resource. Reconciliation engine 420 may be coupled to a database (e.g., reconciled data store 440), which may be used to store reconciled data records.

In example implementations, reconciliation engine 420 may be hosted on a computer 410 that includes at least one processor 411 and at least one memory 412. Memory 412 may be a non-transitory computer-readable medium or storage device. In example implementations, computer 410 may be a physical machine or a virtual machine hosted, for example, on a computer network.

In example implementations, reconciliation engine 420 may be coupled to, or include, a discovery unit 422. Discovery unit 422 may be configured to discover data records in the different data resources or to receive data records from different data sources. Generally, instances of the data records may include similar attributes and associated data. However, a data source may define an attribute of a resource in a manner different than another data source defines attributes of the resource.

Reconciliation engine 420 further includes an identification unit 424 and a merging unit 426. Identification unit 424 may include processes for identifying the discovered or received data records, for example, by identifying respective keys in the data records. In example implementations, identification unit 424 may also determine whether each data source (in which a data record is located) is a Creative data source or an Additive data source. If all data sources are Additive data sources, no reconciliation processes may be initiated by merging unit 426.

Merging unit 426 may implement reconciliation processes (e.g., reconciliation method 300) for merging or consolidating one or more of the data records received from the multiple data sources to create a reconciled data record (e.g., reconciled data record 441) for a resource (e.g., resource Z), according to pre-defined reconciliation/merger rules (e.g., reconciliation rules of precedence).

Merging unit 426 may initiate a reconciliation process (e.g., reconciliation method 300) for the data records after a data record referencing a selected resource (e.g., resource Z) is found in a first Creative data source. In an example implementation, merging unit 426 may, for example, merge data from the data record found in the first Creative data source into an initial reconciled data record for the resource. Merging unit 426 may then reconcile data from the other data sources (whether Creative or Additive), one data source-by-one data source, into the initial reconciled data record, according to the pre-defined reconciliation/merger rules.

The reconciled data record (e.g., reconciled data record 441) may be stored, for example, in a reconciled data store (e.g., reconciled data store 440) without having duplicates. In some example implementations, the reconciled data record may be stored not only in the reconciled records data store but may also be propagated through the data sources.

The systems and methods described in the foregoing may advantageously improve performance of reconciliation processes for reconciliation of data records since only one pass through the various data records is utilized to create the reconciled data record. Categorization of a data record as being in a Creative data source or an Additive data source specifies whether the data record can trigger the reconciliation process (to create a reconciled data record). Thus, there is no need for any special pre or post processing of data records to look up data externally. In traditional reconciliation processes, pre or post processing steps (that involve repeating the reconciliation rules or flow) may be used to ensure that the reconciled data record contains the best possible data (e.g., recent data, complete data) for every attribute field in the record. The systems and methods of the present disclosure avoid these pre or post processing steps by including Additive data sources in the merger aspect of the reconciliation process. Involving Additive data sources in the merger aspect of the reconciliation process ensures that the reconciled data record contains the best possible data (e.g., recent data) for every attribute field in the record.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art.

What is claimed is:

1. A method implemented by a computer processor for reconciling data in data sources categorized as being creative data sources and additive data sources, the method comprising:
    identifying, by the computer processor, data sources that contain data records referencing a resource;
    determining, by the computer processor, whether each of the identified data sources is a creative data source based on a data record referencing the resource whose existence is confirmed on a network or an additive data source based on the data record referencing the resource whose existence is not confirmed on the network;
    when all of the identified data sources are additive data sources, terminating, by the computer processor, a data reconciliation process;
    when all of the identified data sources are not additive data sources, finding, by the computer processor, a first creative data source amongst the identified data sources;
    initiating, by the computer processor, the data reconciliation process by merging attributes from the data record in the first creative data source into an initial reconciled data record for the resource; and
    preparing, by the computer processor, a final reconciled data record for the resource by further reconciling additional attributes from the additive data sources and additional creative data sources from amongst the identified data sources by traversing the additive data sources and the additional creative data sources using a single pass to collect the additional attributes from the additive data sources and the additional creative data sources into the initial reconciled data record without pre-processing the additional attributes from the additive data sources and the additional creative data sources.

2. The method as in claim 1, wherein merging the attributes comprises merging the attributes according to a set of reconciliation rules of precedence that determine the additional attributes to select from the additive data sources and the additional creative data sources to include in the initial reconciled data record.

3. The method as in claim 1, wherein further reconciling the additional attributes from the additive data sources and the additional creative data sources is done one data source-by one data source.

4. A data management system comprising:
    at least one processor; and
    a non-transitory computer-readable storage medium including instructions executable by the at least one processor, the instructions configured to implement a reconciliation engine configured to:
        identify data sources that contain data records referencing a resource;
        determine whether each of the identified data sources is a creative data source based on a respective data record referencing the resource whose existence is confirmed on a network or an additive data source based on the respective data record referencing the resource whose existence is not confirmed on the network;
        when all of the identified data sources are additive data sources, terminate a data reconciliation process;
        when all of the identified data sources are not additive data sources, find a first creative data source amongst the identified data sources;
        initiate the data reconciliation process by merging attributes from the data record in the first creative data source into an initial reconciled data record for the resource; and
        prepare a final reconciled data record for the resource by further reconciling additional attributes from the additive data sources and additional creative data sources from amongst the identified data sources by traversing the additive data sources and the additional creative data sources using a single pass to collect the additional attributes from the additive data sources and the additional creative data sources into the initial reconciled data record without pre-processing the additional attributes from the additive data sources and the additional creative data sources.

5. The data management system of claim 4, wherein the reconciliation engine configured to merge the attributes comprises the reconciliation engine configured to merge the attributes according to a set of reconciliation rules of precedence that determine the additional attributes to select from the additive data sources and the additional creative data sources to include in the initial reconciled data record.

6. The data management system of claim 4, wherein the reconciliation engine configured to further reconcile the additional attributes from the additive data sources and the additional creative data sources is done one data source-by one data source.

7. A non-transitory computer-readable medium storing instructions that when executed cause at least one processor to:
- identify data sources that contain data records referencing a resource;
- determine whether each of the identified data sources is a creative data source based on a respective data record referencing the resource whose existence is confirmed on a network or an additive data source based on the respective data record referencing the resource whose existence is not confirmed on the network;
- when all of the identified data sources are additive data sources, terminate a data reconciliation process;
- when all of the identified data sources are not additive data sources, find a first creative data source amongst the identified data sources;
- initiate the data reconciliation process by merging attributes from the data record in the first creative data source into an initial reconciled data record for the resource; and
- prepare a final reconciled data record for the resource by further reconciling additional attributes from the additive data sources and additional creative data sources from amongst the identified data sources by traversing the additive data sources and the additional creative data sources using a single pass to collect the additional attributes from the additive data sources and the additional creative data sources into the initial reconciled data record without pre-processing the additional attributes from the additive data sources and the additional creative data sources.

8. The non-transitory computer-readable medium of claim 7, wherein the instructions that cause the processor to merge the attributes comprise instructions that cause the processor to merge the attributes according to a set of reconciliation rules of precedence that determine the additional attributes to select from the additive data sources and the additional creative data sources to include in the initial reconciled data record.

9. The non-transitory computer-readable medium of claim 7, wherein the instructions that cause the processor to further reconcile the additional attributes from the additives data sources and the additional creative data sources is done one data source-by one data source.

* * * * *